Dec. 3, 1935.   V. DI CARLO ET AL   2,023,313
TELEMETER OR LIKE INSTRUMENT
Filed March 29, 1934
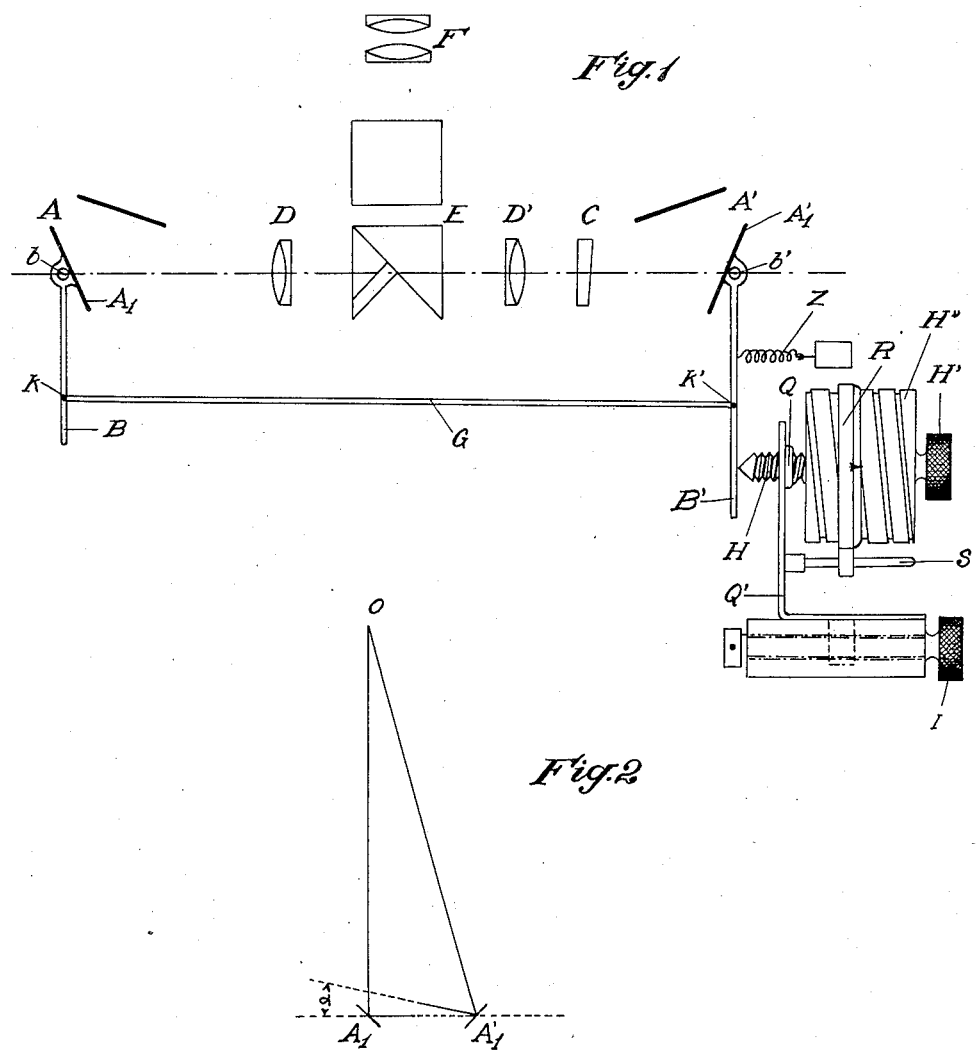

Patented Dec. 3, 1935

2,023,313

UNITED STATES PATENT OFFICE 2,023,313

TELEMETER OR LIKE INSTRUMENT

Vincenzo Di Carlo and Vincenzo Aquilecchia, Rome, Italy

Application March 29, 1934, Serial No. 718,028
In Italy April 10, 1933

8 Claims. (Cl. 88—2.7)

In the telemeters the measurement of a distance is obtained through the measurement of an angle the value of which depends upon the length of the base and the distance of the object.

Besides, as the measurements of distances by ordinary range finders are always affected by a personal error of the operator, depending from his sensitiveness of sight, the present invention concerns also an arrangement for the correction of this personal error of the operator by means of the adjustment of the instrument in accordance with the sensitiveness of sight of said operator.

In ordinary telemeters or like instruments either of the coincidence or of the stereoscopic type, the beams of light proceeding from the sighted object fall on two reflecting systems which are each fixed on one end of the base, one of the reflected beams being acted upon through a deflecting system or diasporameter in order to effect the measurement of the parallactic angle.

The present invention essentially consists in differentially acting upon both beams of light which proceed from the object and fall on the two reflecting systems of the telemeter. This may be obtained by acting either on the reflecting systems placed at the ends of the instrument or on deflectors and diasporameters, or even on the central system.

In practice, as the base is ordinarily constituted by the instrument of measurement itself, the size of which is necessarily limited, whilst the distances to be measured are large, the parallactic angle is very small; and the measure of said angle is never mathematically free from errors which affect the measured value of the distance, the amount of error of said measure being inversely proportional to the length of the base and consequently to the magnitude of the parallactic angle.

In ordinary telemeters it is customary to measure either the distance of the vised object or the parallactic angle, which is the same thing, by measuring the displacement that must be given to a system that deflects one image beam in order to bring said system from the "infinity" position to the position of collimation with the other image formed by another image beam not acted upon. As the parallactic angles are always very small, in practice the mechanical transmission that imparts in ordinary telemeters the movement to said deflecting system as well as to the scale of the distances is so made that it shall have a relatively large displacement for relatively very small differences in the parallactic angle.

The present invention is based on the discovery that, if beside the said beam deflecting system, whichever it may be, another deflecting system is inserted into the telemeter, which second system operates on the contrary in such a way as to lead away from collimation, however in a slightly smaller measure, the other image beam which is not acted upon in the known telemeters, a measure of the distance of a great precision will be obtained. This is due not only to the fact that, in order to obtain the collimation a larger displacement of the first deflecting system than in ordinary telemeters must be made, but also to the fact that, owing to physiological reasons, the operator will perceive the collimation with a much greater precision.

The ratio between the elementary displacements of the beam which is approached to collimation and the corresponding contemporary displacements of the other beam which is driven off collimation is made constant (by suitably constructing the telemeter) and the nearer said ratio is to unity the greater will be the exactness of the telemeter. Said constant ratio can be represented by the mathematical formula $$\frac{n}{n-1}$$

wherein $n$ means the displacements of the beam of rays approaching to collimation and $(n-1)$ the displacements of the other beam driven off collimation, $n$ being a number that is chosen according to desire in the construction according to the other characteristics which are wanted in the telemeter.

The principle of the invention can be applied in many ways and either to the coincidence telemeters and to stereoscopical ones, the inventors desiring not to be restricted to any given type of such instruments, as it will appear evident pursuant to what has been said hereinabove, and as it will furtherly result from the following explanation and examples.

An object of the present invention is to provide means for measuring the parallactic angle through a multiplication of said parallactic angle, which means may be applied to any kind of telemeters or like instruments.

A further object of our invention is to provide means as stated above which are simple and not subject to get out of order.

In the drawing, reference to which will be made hereinafter, the invention is shown as applied in a telemeter of the coincidence type, in which one of the mirrors of each reflecting system placed at the ends of the instrument is considered as movable. It will appear however evident to those skilled in the art that, without departing from the scope of the present invention, the arrangement can be applied to two deflectors and/or diasporameters, or even to the prisms of the central system which act on the issuing beams. Similarly our invention can be applied either on a telemeter of the coincidence type or on a stereoscopic telemeter, and to instruments for the measurement of angles.

According to our invention, the two beams of rays move simultaneously and in the same direction with the constant ratio $$\frac{n}{n-1}$$

and the angle under which the object is viewed from the ends of the base of the optical system is defined by the sum of the differences between the angles generated by the movable beams, in which ratio, $n$ can be a constant of the telemeter or a variable quantity established in function of the coordinates of the object the distance of which is being measured.

In the accompanying drawing, an embodiment of the invention is diagrammatically shown by way of example.

In the drawing:

Fig. 1 is a diagrammatical view of a coincidence telemeter embodying the invention, and Fig. 2 is a simple sketch showing the path of two beams of light previous to the measuring operation.

Fig. 1, A and A' are two systems of reflecting mirrors. Mirror $A_1$, of the first system is positively connected to a lever B which is pivoted at $b$, whilst mirror $A'_1$ of the second system is positively connected to a lever B' which is pivoted at $b'$.

C is a prism designated to operate the rectification of the instrument; D and D' are two object lens systems, E is the central system and F the eye lens system.

The arms B and B' are pivotally connected to a link G at the two ends $k$ and $k'$ thereof, the operative portion $b$—$k$ of the arm B being of different length from the operative portion $b'$—$k'$ of the arm B'. On moving the link G, the mirrors $A_1$ and $A'_1$ rotate through angles which are inversely proportional to the length of the operative portions of the arms B and B'. The ratio between the lengths of said operative portions is equal to $$\frac{n}{n-1}$$

The arm B' is made to adhere, by means of a spring Z or the like, to a screw threaded member H carrying a drum provided with a scale of distances. The thread on member H engages within a nut Q fixed on the support Q' in such a way that the rotation of H, which is operated by acting on the milled head H', causes the axial displacement of member H. The graduated drum H'', which is fastened to screw H, is provided with an external holicoidal groove in which member R engages, this member being guided by the rod S so that it can axially move but is blocked against rotation. The index of distances is engraved or otherwise marked on member R.

The rotation of member H causes the angular displacement of the arm B' and the associated mirror $A'_1$, and through link G the angular displacement of the arm B and the associated mirror $A_1$, the displacement of said last mentioned mirror being different from the displacement of mirror $A_1'$, owing to the difference between the portions $b$—$k$ and $b'$—$k'$ of the two arms B and B'; the rotation of member H furtherly causes the longitudinal displacement of member R that carries the index of ranges.

Fig. 2, representing the path of the beams prior to the adjustment of the mirrors, shows that the beam falling on $A_1$ issues in the direction of the base and the rays falling on $A_1'$ are inclined of an angle $\alpha$ with respect to the base.

When the milled head H' is rotated, the mirrors $A_1$ and $A'_1$ rotate in such a way that the angles successively formed by the beams are gradually decreasing, so that the angle becomes zero when the mirrors will have been rotated the extent of $\alpha.n$ and $\alpha.(n-1)$ respectively.

It may thus be seen that the measurement of angle $\alpha$ however little, is effected by means of the measurement of an angle which is $n$ times larger, and therefore with an accuracy $n$ times larger, whatever the adopted optical mechanical arrangement may be.

We repeat here that our method of measurement may be carried out in other ways than the one specified hereinabove, that is: that instead of moving the mirrors, two different systems may be differentially moved, as for instance two deflectors systems or diasporameters or parallel faced glass plates. These different ways may also be adopted in combination.

Instead of the link and arms connection, other trains of transmission may be used.

Our invention is also available for inclinometers and for like optical instruments.

What we claim is:

1. A plurality of adjustable multiple image deflecting means, means for adjusting one of said image deflecting means toward collimation and interconnecting means between the image deflecting means causing movement of the second deflecting means away from collimation upon a movement of the first image deflecting means toward collimation, the movement of the first image deflecting means being proportionally greater than the movement of the second image deflecting means.

2. A plurality of adjustable multiple image deflecting means, means for adjusting one of said image deflecting means toward collimation and interconnecting means between the image deflecting means causing movement of the second deflecting means away from collimation upon a movement of the first image deflecting means toward collimation the movement of the first image deflecting means bearing the ratio of $$\frac{n}{n-1}$$

to the movement of the second image deflecting means where $n$ represents a constant of the telemeter.

3. A plurality of adjustable multiple image reflecting means, means for adjusting one of said image reflecting means toward collimation and interconnecting means between the image reflecting means causing movement of the second reflecting means away from collimation upon a movement of the first image reflecting means toward collimation, the movement of the first image reflecting means being proportionally greater than the movement of the second image reflecting means.

4. In a telemeter two adjustable multiple image deflecting means, a common means for simultaneously moving said image deflecting means the one toward collimation and the other a less degree away from collimation.

5. The device as claimed in claim 1 in which the adjustable multiple image deflecting means consists of mirrors and the adjusting means moves said mirrors in the same time in the same direction but the movement of the one mirror is greater than the movement of the other.

6. The device as claimed in claim 1 in which the means for moving the multiple image deflecting means comprises two arms attached respectively to the deflecting means the lengths of said two arms being inversely proportional to the amounts of rotation to be imparted to the respective mirrors, a rod connecting said arms, and means for moving said rod in a horizontal direction.

7. A plurality of adjustable multiple image deflecting means, means for adjusting one of said image deflecting means toward collimation and interconnecting means between the image deflecting means causing movement of the second deflecting means away from collimation upon a movement of the first image deflecting means toward collimation, the two deflecting means and their interconnecting means being such that the displacement of the first image is proportionately greater than the displacement of the second image.

8. A plurality of adjustable multiple image deflecting means, means for adjusting one of said image deflecting means toward collimation and interconnecting means between the image deflecting means causing movement of the second deflecting means away from collimation upon a movement of the first image deflecting means toward collimation, the two deflecting means and their interconnecting means being such that the displacement of the first image bears the ratio of $$\frac{n}{n-1}$$

to the movement of the second image where $n$ represents a constant of the telemeter.

VINCENZO DI CARLO.
VINCENZO AQUILECCHIA.